United States Patent [19]
Yajima

[11] Patent Number: 5,807,085
[45] Date of Patent: Sep. 15, 1998

[54] LIQUID MEDICINE SUPPLYING SYSTEM WITH VALVE DEVICES

[75] Inventor: Takeo Yajima, Musashino, Japan

[73] Assignee: Koganei Corporation, Tokyo, Japan

[21] Appl. No.: 629,099

[22] Filed: Apr. 8, 1996

[30] Foreign Application Priority Data

Apr. 12, 1995 [JP] Japan ................................ 7-086772

[51] Int. Cl.[6] .............................. F04B 7/00; F16K 31/08
[52] U.S. Cl. ........................................... 417/505; 251/65
[58] Field of Search ............................. 417/505; 251/65

[56] References Cited

U.S. PATENT DOCUMENTS

| | | | |
|---|---|---|---|
| 4,481,389 | 11/1984 | Johnson | 251/65 |
| 5,009,388 | 4/1991 | Pei-gi et al. | 251/65 |
| 5,052,429 | 10/1991 | Yoo | 251/65 |
| 5,061,156 | 10/1991 | Kuehne et al. | |
| 5,169,117 | 12/1992 | Huang | 251/65 |
| 5,244,360 | 9/1993 | Lefebvre | 417/383 |

FOREIGN PATENT DOCUMENTS 3320386  6/1983  Germany ................. 417/383

*Primary Examiner*—Bibhu Mohanty
*Attorney, Agent, or Firm*—McCormick, Paulding & Huber

[57] ABSTRACT

A liquid medicine supplying system comprises a housing 11 including a pump chamber 27, a diaphragm 28 for changing a volume of the pump chamber 27, a first flow path 31 for guiding liquid in a liquid storage tank to the pump chamber 27 and a second flow path 32 for guiding the liquid stored in the pump chamber 27 to a liquid discharge portion. A first valve body 34 for on-off operating the first flow path 31 is disposed in the first flow path 31. A second valve body 35 for on-off operating the second flow path 32 is disposed in the second flow path 32. Furthermore, a magnet 41 on the follow up side is provided in the valve body 34 and the second valve body 35. Then, in the housing 11, there are provided magnets 43a, 44a and the like cause the magnetic field to act on the magnet 41 on the follow up side, whereby the first valve body 34 and the second valve body 35 are set at opening positions or closing positions. With this arrangement, there is provided the liquid medicine supplying system having the valve devices for positively on-off operating the flow paths without forming complicated flow paths, in which the liquid turns into the valves for on-off operating the flow paths.

6 Claims, 11 Drawing Sheets

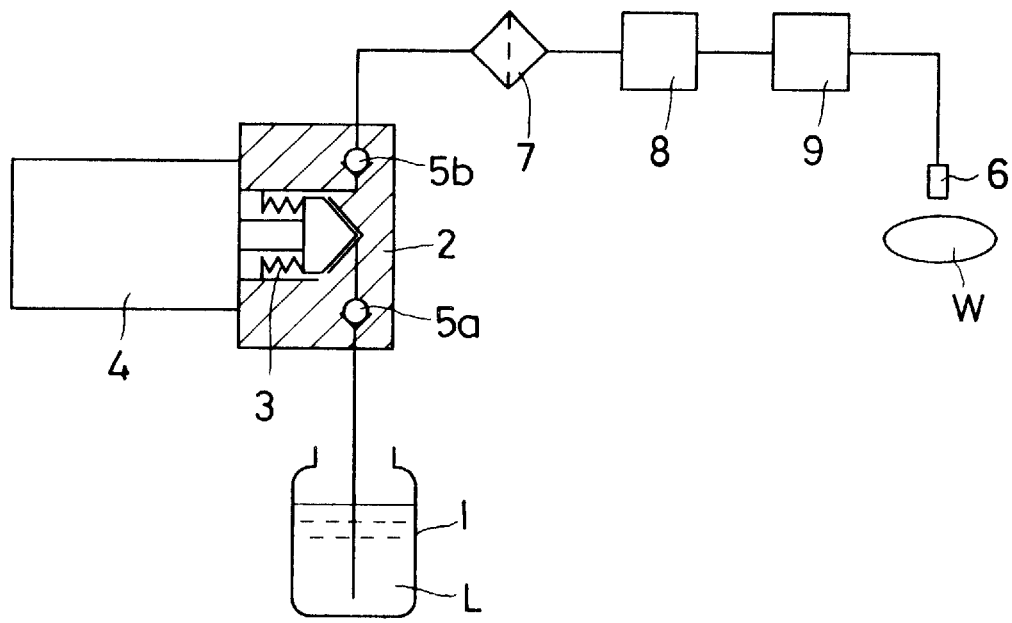
Fig.1
Fig.2(a)
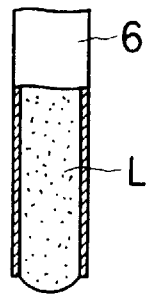
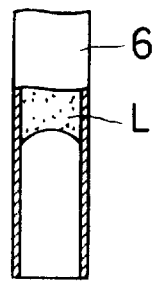
Fig.2(b)
Fig.2(c)
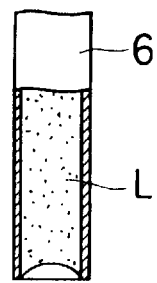
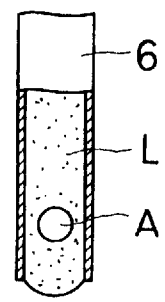
Fig.2(d)

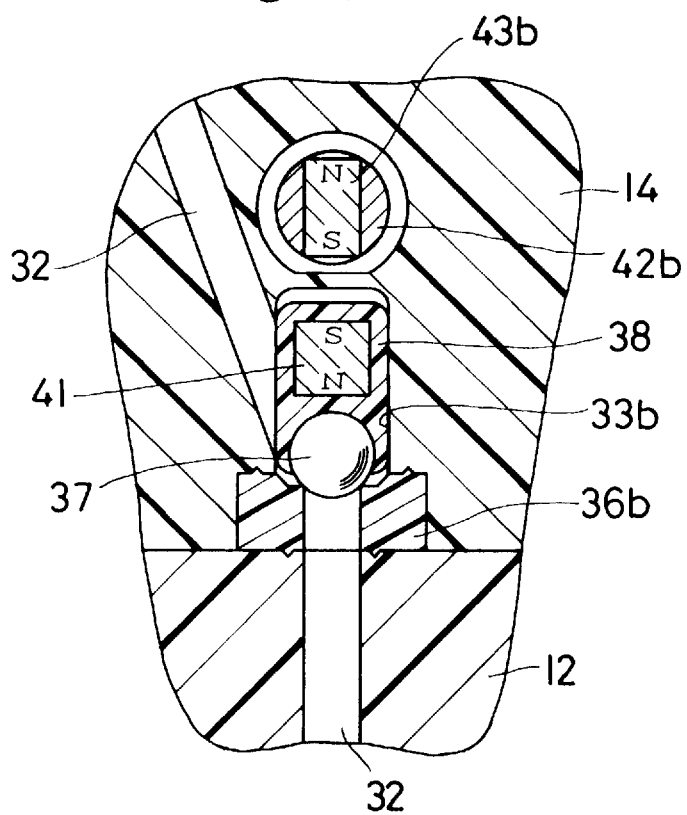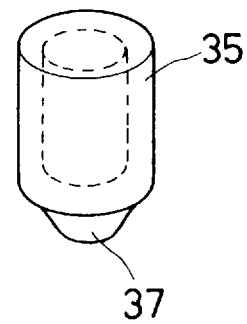

LIQUID MEDICINE SUPPLYING SYSTEM WITH VALVE DEVICES

BACKGROUND OF THE INVENTION

1. Field of the Invention

This invention relates to a liquid medicine supplying system provided with valve devices for coating liquid medicine and valve devices for on-off operating flow paths.

2. Related Art Statement

In the fields including a field of techniques of manufacturing semiconductor wafers, a field of techniques of manufacturing liquid crystal substrates, a field of techniques of manufacturing multi-layer wiring substrates and so forth, liquid medicines including a photoresist solution and alkaline and acidic treating solutions are used.

The respective liquid medicines are guided from medicine liquid storage tanks to liquid medicine discharge portions through flow paths by the operation of pumps. Then, valve devices for controlling the flows of the liquid medicine are assembled into the flow paths.

As one of the liquid medicine supplying pumps, there has been developed one using a pump of a bellows type as disclosed in U.S. Pat. No. 5,061,156 for example.

FIG. 1 is a drawing showing a liquid medicine supplying system as being an object of development. This system is used for coating liquid medicine L such as a resist solution contained in a container (a liquid medicine storage tank) 1 onto a semiconductor wafer W. As shown, a housing 2 is provided with a driving member 4 for driving a bellows 3 reciprocatingly to and from the housing 2. Then, the liquid medicine L is supplied to a nozzle (a liquid medicine discharge portion) 6 through two check valves 5a and 5b by the reciprocating movement of the bellows 3. In a liquid medicine supplying path provided between the nozzle 6 and the check valve 5b, there are provided a filter 7 for removing foreign materials contained in the liquid medicine L, a diaphragm valve 8 for on-off operating a supplying path and a suck back valve 9.

When the liquid medicine L is coated onto the semiconductor wafer W by use of the shown liquid medicine supplying system, firstly, the bellows 3 is retracted. With this arrangement, the liquid medicine L flows into a pump chamber through the check valve 5a. Subsequently, the bellows 3 is moved forward. With this arrangement, the liquid medicine L is supplied to the nozzle 6 through the check valve 5b. After a predetermined quantity of the liquid medicine L is discharged from the nozzle 6, in order to prevent the liquid medicine from drooling from the nozzle 6, the diaphragm valve 8 is closed to operate the suck back valve 9. With this arrangement, the liquid medicine is sucked into the forward end portion of the nozzle 6.

In the shown check valves 5a and 5b, the above-described closing operation is carried out by the gravity. Accordingly, depending upon the positions and postures of the check valves 5a and 5b, in order to carry out the closing operation, there may be such a case that springs are assembled into the flow paths, the liquid medicine turns into these portions, where the liquid medicine may stagnate.

On the other hand, in the liquid medicine supplying system in use for discharging the liquid medicine, there is such a system wherein suck back is carried out by the operation of a pump without using the suck back valve. In this case, the diaphragm valve for on-off operating the liquid medicine supplying path is provided in the liquid medicine supplying path for supplying the liquid medicine to the nozzle. The behavior of the liquid medicine in the nozzle in this case is shown in FIG. 2. That is, firstly, when the discharge of the liquid medicine L is completed by the operation of the pump, the state shown in FIG. 2(a) is brought about. Subsequently, the suck back operation is carried out by the pump, and the liquid medicine in the nozzle 6 is sucked as shown in FIG. 2(b). Thereafter, the diaphragm valve is closed. At this time, the diaphragm carries out the operation of closing the flow path. With this arrangement, a variation in volume occurs in the valve chamber. Then, along with this variation in volume, the liquid level is lowered again as shown in FIG. 2(c).

Accordingly, it is necessary to set the suck back valve at a quantity including an amount of the expected variation in volume of the diaphragm valve. For this reason, the liquid surface at the time of suck back rises to a very large quantity. If the liquid surface is raised high as described above, then, as shown in FIG. 2(d), during the process of suck back, the liquid turns into a portion under the liquid surface, whereby a bubble A is apt to appear in the nozzle. This bubble A gives an adverse influence during coating of the liquid medicine L.

Even when a diaphragm valve is provided at a portion of the check valve 5b in the system shown in FIG. 1 and the suck back is carried out by the operation of the pump, if the flow path is closed by the diaphragm valve, it is found that the liquid surface in the nozzle is fluctuated high.

Further, the liquid medicine supplying systems, which have been developed so far, include one type, in which only feeding of the liquid medicine under pressure is carried out by the pump and suck back operation of the liquid medicine in the nozzle is carried out by the suck back valve 9 and the other type, in which the suck back operation is carried out by the pump. In either one of these types, the diaphragm type valve is used. Accordingly, the flow paths for the liquid medicine become complicated, thus unabling to avoid the stagnation of the liquid medicine in the flow paths. When the stagnation occurs, the liquid medicine may be changed in quality, thus starting dusting.

When the stagnation proceeds to some degree, even if the flow paths are washed, dusting cannot be avoided. Furthermore, depending upon the types of the liquid medicine, such an adverse influence may take place that the liquid medicine flows into large diameter portions of the flow paths, whereby negative pressure takes place, the liquid medicine is changed in its quality and so forth. Further, when the diaphragm valve is used, it has a large diaphragm chamber due to its construction. For this reason, the flow paths may become broad or narrow. Furthermore, there are portions such as corners, where it is difficult for the liquid medicine to flow through. Then, the suck back valves and pumps, which have been developed so far, have the similar tendencies.

In the case where dusting cannot be avoided even when washing is carried out as described above, component parts may be exchanged. However, such problem may be raised that the working needs much time and the workability becomes low.

SUMMARY OF THE INVENTION

It is an object of the present invention to provide valve devices capable of positively on-off operating the flow paths without forming complicated flow paths, in which the liquid medicine turns into valves for on-off operating the flow paths for guiding the liquid, and a liquid medicine supplying system provided with the valve devices described above.

It is another object of the present invention to provide a liquid medicine supplying system capable of improving the discharge accuracy.

It is a further object of the present invention to provide a liquid medicine supplying system having satisfactory maintenance properties in part exchange and so forth.

The following is the brief description of the outline of typical one out of inventions disclosed in the present application.

That is, the liquid medicine supplying system according to the present invention is characterized by comprising: a housing including a pump chamber, a reciprocating member for changing a volume of the pump chamber, a first flow path for guiding liquid stored in a liquid storage tank to the pump chamber and a second flow path for guiding the liquid stored in the pump chamber to a liquid discharge portion; a first valve body disposed in the first flow path, for on-off operating the first flow path; a second valve body disposed in the second flow path, for on-off operating the second flow path; a magnet on the follow up side which is provided at least one of the first valve body and the second valve body; and a driving means provided in the housing, for causing the magnetic field to act on a magnet on the follow up side, whereby the valve body is set at an opening position or a closing position.

In the above-described liquid medicine supplying system, the polarity of the magnetic field, which acts on the magnet on the follow up side, may be changed by the driving means, whereby the valve body is set at the opening position or the closing position. In this case, the driving means may be made to be a magnet or magnets movably provided in the housing or a solenoid coil disposed in the housing.

Furthermore, a magnetic force acting on the magnet on the follow up side may be changed by the driving means, whereby the valve body is set at the opening position or the closing position. Then, in this case also, the driving means may be made to be as magnet or magnets movably provided in the housing.

In the liquid medicine supplying system with the above-described construction, the member for driving the valve body is not exposed into the flow path. Accordingly, the flow paths for guiding the liquid medicine are simplified, so that the liquid medicine can be prevented from stagnating in the flow paths. Furthermore, when the flow paths are filled up with the liquid medicine at the first stage of the use of the system, removal of air from the flow paths can be carried out quickly. Moreover, since the valve body is disposed in the flow path, in the on-off operation of the valve body, the liquid medicine in the flow path can be prevented from moving. Further, when the suck back operation is carried out by the pump back operation is carried out by the pump after the liquid medicine is discharged from the nozzle, closing of the flow paths is released by the valve bodies disposed in the flow paths. Accordingly, fluctuations of the liquid surface in the nozzle can be controlled to be low, so that the liquid medicine can be discharged from the nozzle at high accuracy.

In this case, according to the present invention, control of the discharge quantity of the liquid medicine at high accuracy, which has been difficult when the flow paths are on-off operated by use of the diaphragm valve, can be realized by disposing the valve bodies in the flow paths. That is, in the case where on-off operation of the flow paths is carried out by the diaphragm valve, the on-off operation of the flow paths is carried out by approaching or retracting the diaphragm to or from a valve seat for communicating a port at the flow-in side of the liquid with a port at the flow-out side. For this, the on-off operation of the diaphragm in this on-off operation causes the flow of the liquid in the flow paths.

In contrast thereto, according to the present invention, no flow of the liquid is caused in the flow paths. Accordingly, in the case of on-off operation of the valve bodies, the discharge valve can be prevented from being fluctuated, so that the discharge valve of the liquid medicine can be controlled at high accuracy.

Further, in the above-described liquid medicine supplying system, such an arrangement may be adopted that the housing consists of a valve housing and a pump housing, which are separable from each other, the valve housing is provided with the reciprocating member, the first and second flow paths, the first and second flow paths, the first and second valve bodies and the magnet on the follow up side, the pump driving means for driving the reciprocating member is provided on the pump housing are detachably connected to each other by a magnet for fastening.

Accordingly, the valve housing and the pump housing are made separable from each other, so that maintenance and inspections and part exchange of the system may be easily carried out.

On the other hand, the valve device according to the present invention is characterized by including: a housing having a flow path, into which the liquid flows in, and a flow path, from which the liquid flows out; a valve body disposed in at connecting portion between the flow path for flow-in and a flow path for flow-out for on-off operating the flow paths; a magnet on the follow up side provided on the valve body and driving means for causing the magnetic field on the magnet on the follow up side, whereby the valve body is set at the opening position or the closing position.

In the above-described valve device, the polarity of the magnetic field may be changed by the driving means, whereby the valve body is set at the opening position or the closing position. In this case, the driving means may be made to be a magnet or magnets movably provided in the housing or a solenoid coil provided in the housing.

Furthermore, magnetic force acting on the magnet on the follow up side may be changed by the driving means, whereby the valve body is set at the opening position or the closing position. Then, in this case also, the driving means may be made to be a magnet or magnets movably provided in the housing.

In the valve device with the above-described arrangement, since the valve body is disposed in the flow paths, even if the valve body carries out the on-off operation, the fluid at the side of flow-out can be prevented from being fluctuated. Furthermore, the magnetic force is caused to act on the magnet provided on the valve body, whereby the valve body carries out the on-off operation, so that the flow paths are simplified to prevent the stagnation of the fluid from occurring, without assembling spring member or the like into the flow paths, through which the fluid flows.

The above-described and other objects, and novel feature of the present invention will become apparent more fully from the description of the following specification in conjunction with the accompanying drawings.

BRIEF DESCRIPTION OF THE DRAWINGS

FIG. 1 is a schematic view showing the liquid medicine supplying system as being an object of development;

FIG. 2(a) through 2(d) are explanatory views showing the states of the liquid medicine in the nozzles for coating the liquid medicine;

FIG. 6(a) is an enlarged sectional view showing a valve body portion in FIG. 3 and FIG. 6(b) is an oblique view of the valve body shown in FIG. 6(a);

DESCRIPTION OF THE PREFERRED EMBODIMENT

An embodiment of the present invention will hereunder be described in detail with reference to drawings.

Figure 3:
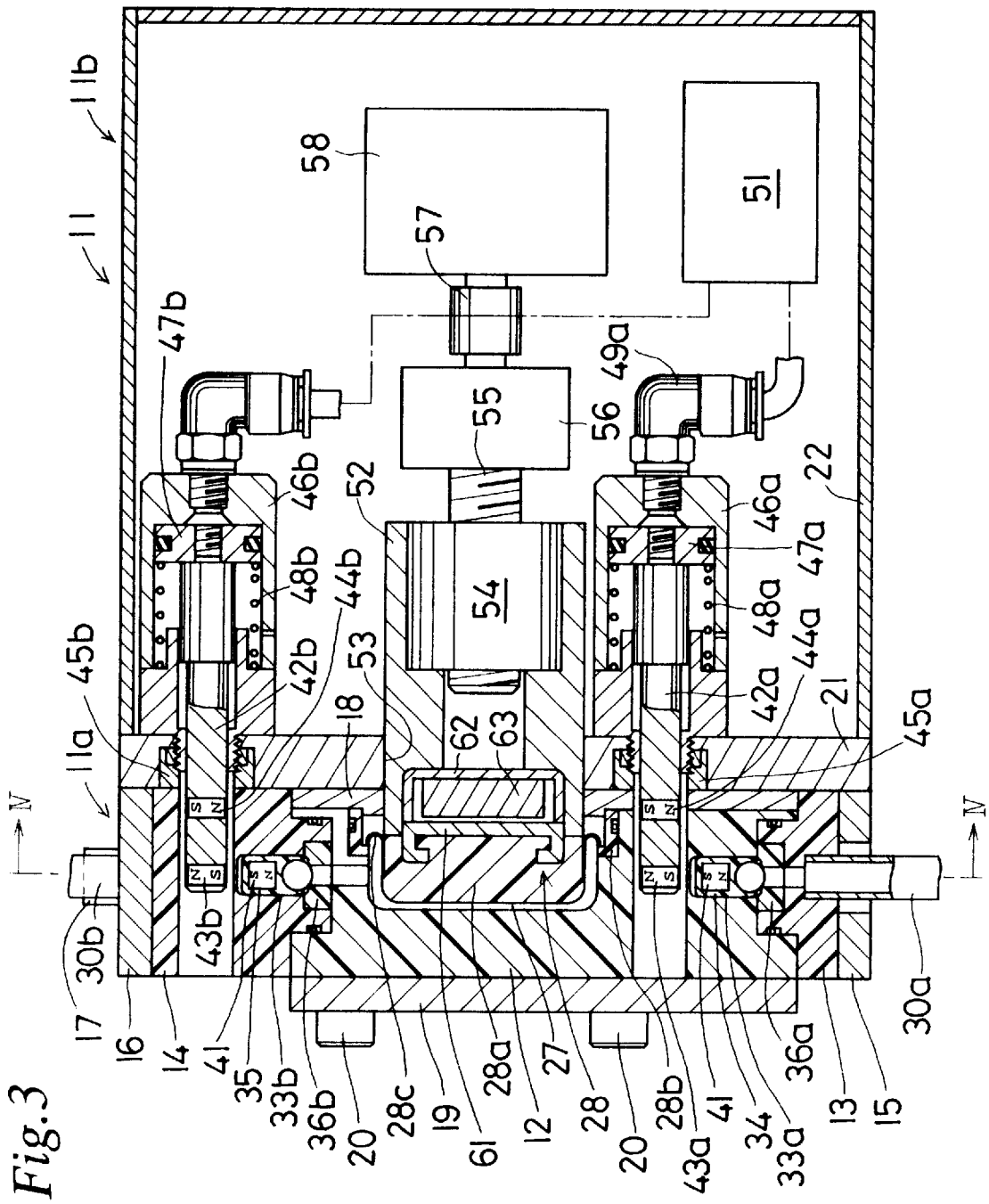
FIG. 3 shows the liquid medicine supplying system as an embodiment of the present invention and is a sectional view taken along the line III—III in FIG. 4.
Figure 4:
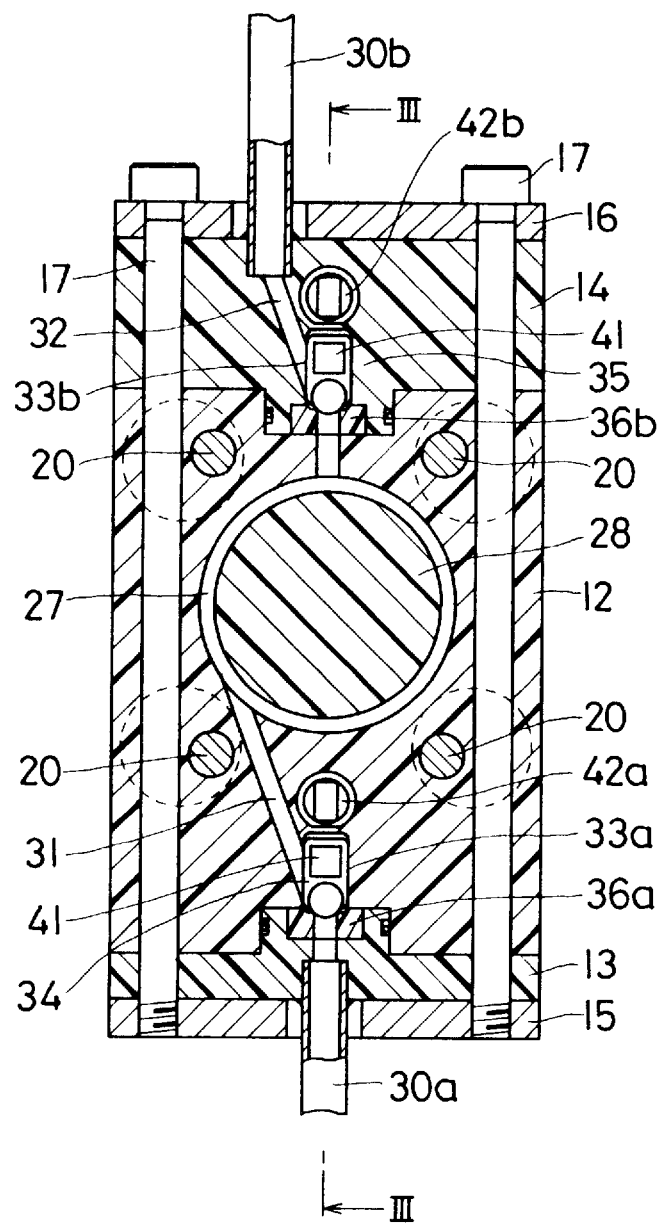
FIG. 4 is a sectional view taken along the line IV—IV in FIG. 3.

FIG. 3 and 4 show an embodiment of the liquid medicine supplying system according to the present invention. FIG. 3 is the sectional view taken along the line III—III in FIG. 4. FIG. 4 is the sectional view taken along the line IV—IV in FIG. 3.

A housing 11 of this liquid medicine supplying system includes a valve housing 11a and a pump housing 11b. Then, the valve housing 11a and the pump housing 11b are separable from each other. The valve housing 11a includes a center block 12, two outer blocks 13 and 14 and end plates 15 and 16. The three blocks 12 to 14 are made of resin of high resistance to corrosion such as PTFE (polytetrafluoethylene) and PFA, which are fluorine resin, respectively. Then, these blocks are assembled by two bolts 17 shown in FIG. 4. A fastening plate 18 made of a magnetic body such as iron is provided on one surface of this valve housing 11a. Furthermore, a stop plate 19 is provided on the other surface, and these plates 18 and 19 are fixed through bolts 20.

Figure 5A:
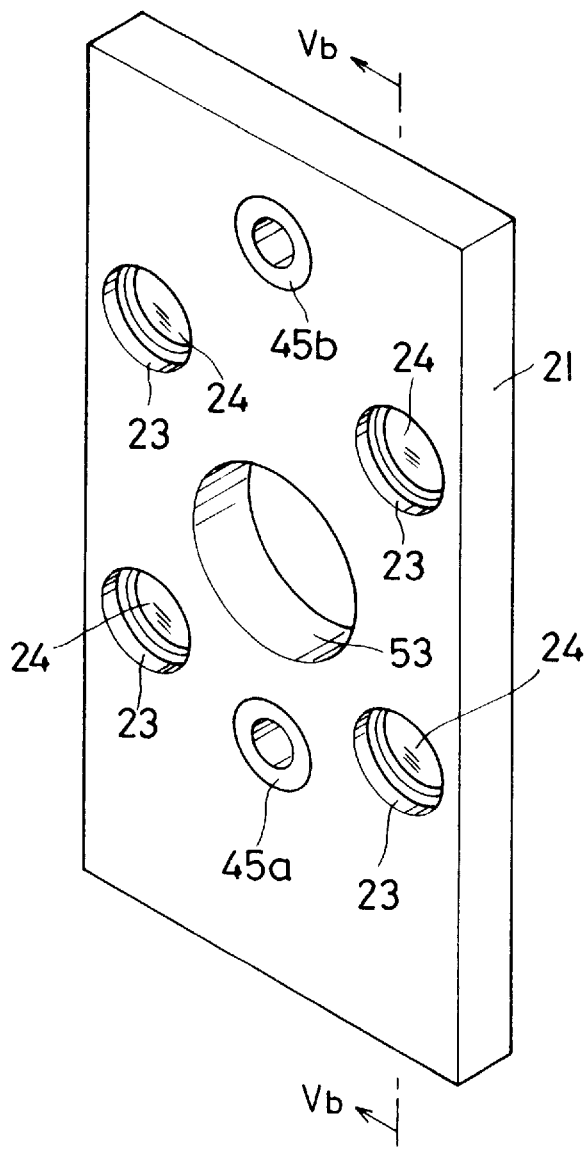
FIG. 5(a) is an oblique view showing a fastening plate shown in FIG. 3
Figure 5B:
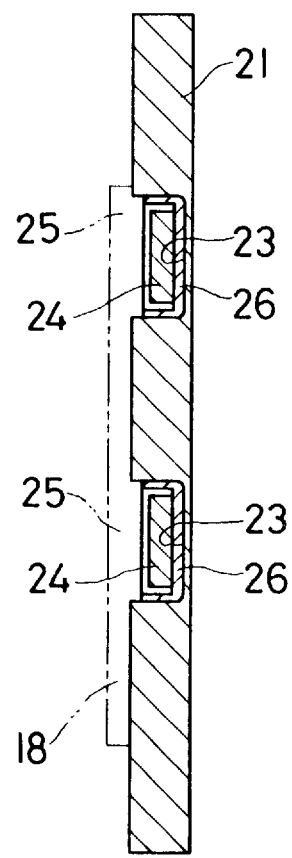
FIG. 5(b) is a sectional view taken along the line Vb—Vb in FIG. 5(a)

The pump housing 11b includes a fastening plate 21 brought into contact with the inner surface of the valve housing 11a and a cover 22 fixed thereto. As shown in FIG. 5, magnets 24 are buried into four recesses 23 formed in the fastening plate 21. Accordingly, projections 25 for positioning formed on the fastening plate 18 are opposed to the magnets 24 and coupled into the recessed 23, so that the both housings 11a and 11b are connected to each other. Then, the both housings 11a and 11b are connected to each other, so that the housing 11 is completed in assembly. In this case, when the valve housing 11a is pulled strongly against the magnetic force of the magnets 24, the valve housing 11a can be separated from the pump housing 11b. As described above, according to the present invention, the housing 11 is constituted by the valve housing 11a and the pump housing 11b and these housings 11a and 11b are made separable, whereby maintenance of the system is made easier. Incidentally, a magnetic circuit forming members are designated by reference numerals 26.

In this case, instead of fastening the housings 11a to the housing 11b by the magnetic force of the magnets 24, the two housings may be fastened to each other by use of a clamp member. Furthermore, in addition to the fastening by the magnetic force, the clamp member may be adopted.

In the valve housing 11a, a pump chamber 27 is formed. This pump chamber 27 included a center block 12 and a diaphragm 28 as being a reciprocating member fixed to the center block 12. The diaphragm 28 included a connecting portion 28a as being a central portion, an annular locking portion 28b and an elastically deformable portion 28c connecting therebetween. Incidentally, the diaphragm 28 is also made of resin such as PTFE. Then, the connecting portion 28a is reciprocated laterally in FIG. 3, whereby the elastically deformable portion 28c is deformed, so that the pump operation is achieved.

One end portion of a flow-in hose 30a is connected to the valve housing 11a. The other end of the flow-in hose 30a is connected to a liquid medicine storage tank containing therein liquid medicine such as a resist solution. In order to connect a flow path of this flow-in hose 30a to the pump chamber 27, in the valve housing 11a, there is formed a first flow path 31 for guiding the liquid medicine stored in the liquid medicine storage tank to the pump chamber 27 as shown in FIG. 4.

Furthermore, one end portion of a flow-out hose 30b is connected to the valve housing 11a. A nozzle as being a liquid medicine discharge portion is connected to the other end of this hose 30b. In order to connect a flow path of this flow-out hose 30b to the pump chamber 27, in the valve housing 11a, there is formed a second flow path 32 for guiding the liquid medicine stored in the pump chamber 27 to the nozzle as shown in FIG. 4.

Incidentally, a filter similar to the filter 7 shown in FIG. 1 may be provided in the flow-in hose 30a. Furthermore, this filter 7 may be provided in the flow-out hose 30b. Further, the both hoses 30a and 30b may be made of a resinous material such as PTFE, respectively.

A valve chamber 33a is formed in the first flow path 31. In this valve chamber 33a, a first valve body 34 for on-off operating the first flow path 31 is provided. Furthermore, a valve chamber 33b is formed in the second flow path 32. Then, a second valve body 35 for on-off operating the second flow path 32 is provided in this valve chamber 33b. As described above, in this embodiment, the respective valve bodies 34 and 35 are disposed in the flow paths, respectively. With this arrangement, when on-off operations of the respective flow paths are carried out, the flow of the liquid medicine in the flow paths can be prevented from occurring.

FIG. 6 is the sectional view enlargedly showing a portion of the second valve body 35. A valve seat 36b is secured to the bottom portion of the valve chamber 33b of the second valve body 35. Furthermore, the second flow path 32 includes a portion vertically extending from the pump chamber 27 to the valve chamber 33b and a portion inclinedly extending from a side portion of this valve chamber 33b to the flow-out hose 30b. The second valve body 35 has a ball 37 made of ceramics, which is brought into contact with the valve seat 36b. A magnet 41 on the follow up side is assembled to the ball 37 by a valve body 38 made of resin of PTFE. Incidentally, while FIG. 6 shows the second valve body 35, the first valve body 34 has the similar construction. That is, the first valve body 34 also includes the ball 37 made of ceramics and brought into contact with the valve seat 36a, for on-off operating the first flow path 31.

As shown in FIG. 3, a driving rod 42a adjoining to the valve chamber 33a is mounted to the valve housing 11a slidably in the axial direction. This sliding direction is substantially perpendicular to the moving direction of the first valve body 34. Similarly, a driving rod 42b adjoining to the valve chamber 33b is mounted to the valve housing 11a slidably in the axial direction. The sliding direction of this driving rod 42b is in parallel to the sliding direction of the driving rod 42a.

The driving rod 42a includes a magnets 43a and 44a, both of which are on the driving sides. Then, the driving rod 42a is slid in the axial direction, whereby one of the magnets is moved to a position associated with a position of the magnet 41 on the follow up side. In this case, the magnet 43a causes the magnetic field to make the magnet 41 repellent. That is, the magnet 43a applies a magnetic force to the first valve body 34 in the direction of closing the first flow path 31. On the other hand, the other magnet 44a causes a magnetic field to pull the magnet 41 and applies a magnetic force to the first valve body 34 in the direction of opening the first flow path 31. Incidentally, the driving rod 42a extends through an annular sleeve 45a secured to the fastening plate 21 and projects into the pump housing 11b.

In the pump housing 11b, there is provided a pneumatic pressure cylinder 46a for driving the driving rod 42a. This pneumatic pressure cylinder 46a is fixed to the fastening plate 21. Furthermore, the driving rod 42a is secured to a piston 47a provided in the pneumatic pressure cylinder 46a. Further, in the pneumatic pressure cylinder 46a, there is mounted a compression coil spring 48a for returning the piston 47a to the original position. When the piston 47a is positioned at the original position, the magnet 43a on the driving side is at a position opposed to the magnet 41 on the follow up side.

A pneumatic pressure piping 49a is connected to the pneumatic pressure cylinder 46a. Compressed air is supplied to the pneumatic pressure cylinder 46a from a pneumatic pressure source, not shown, through this pneumatic pressure piping 49a and a valve unit 51. Then, when the compressed air is supplied into the pneumatic pressure cylinder 46a, the piston 47a is positioned at a forward limit position. At this time, the magnet 44a on the driving side comes to a position opposed to the magnet 41 on the follow up side.

The second valve body 35 is also driven by the driving rod 42b and a pneumatic pressure cylinder 46b, which have the construction similar to the first valve body 34. Incidentally, as for the members for driving the second valve body 35, the members common to the members for driving the first valve body 34 are designated by adding signs b to the same reference numerals as shown in FIG. 3, and the doubled description will be avoided.

Now, in order to reciprocate the diaphragm 28 laterally in FIG. 3, there is provided a driving member 52. This driving member 52 is projected from a through-hole 53 formed in the fastening plate 21 and is movable reciprocally in the axial direction in the pump housing 11b. Furthermore, a ball screw nut 54 is secured to the driving member 52. Then, a ball screw 55 is rotatably provided by a bearing 56 in the pump housing 11b. This ball screw 55 is threadably coupled to the ball screw nut 54. Furthermore, the ball screw 55 is connected to a main shaft of a motor 58 through a joint 57. Incidentally, in FIG. 3, a member for supporting the driving member 52, the bearing 56 and the motor 58 is omitted in the drawing.

Further, in order to connect the diaphragm 28 to the driving member 52, in the connecting portion 28a of the diaphragm 28, there is provided a connecting member 61 made of a magnetic material. Furthermore, a magnetic circuit forming member 62 made of a magnetic material and a magnet 63 are provided in the driving member 52. The magnet 63 is closely attached to the magnetic circuit forming member 62. Then, this magnetic circuit forming member 62 is closely connected to the connecting member 61 through the magnetic force, so that the diaphragm 28 can be connected to the driving member 52.

Description will hereunder be given of the procedure of discharging the liquid medicine from the nozzle by use of the liquid medicine supplying system shown in FIGS. 3 to 5.

When the operation of the liquid medicine supplying system is started, the compressed air is not supplied to the both pneumatic pressure cylinders 46a and 46b. That is, as shown in FIG. 3, the driving rods 42a and 42b are positioned at the original positions, respectively. Accordingly, the respective magnets 43a and 43b on the driving side are located at positions associated with the magnets 41 on the follow up side of the respective valve bodies 34 and 35. With this arrangement, the both flow paths 31 and 32 are closed by the valve bodies 34 and 35, respectively.

Firstly, the compressed air is supplied into the pneumatic pressure cylinder 46a, whereby the piston 47a is moved forward. Then, the driving rod 42a is moved forward, whereby the magnet 44a on the driving side is moved to a position associated with the magnet 41 on the follow up side. With this arrangement, the magnet 41 on the follow up side is attracted by the magnet 44a on the driving side. Accordingly, the first valve body 34 is separated from the valve seat 36a, whereby the first flow path 31 is opened.

In this state, the motor 58 is driven to move the driving member 52 to the right in FIG. 3. Then, the diaphragm 28 is deformed to enlarge the pump chamber 27, whereby the pump chamber 27 becomes negative in pressure. With this arrangement, the liquid medicine flows into the pump chamber 27 through the flow-in hose 30a.

After the liquid medicine is poured into the pump chamber 27, the compressed air in the pneumatic pressure cylinder 46a is discharged. Then, owing to the resilient force of the spring 48a, the piston 47a and the driving rod 42a are returned to the original positions. Then, the magnet 43a on the driving side is moved to a position associated with the magnet 41 on the follow up side. With this arrangement, the first valve body 34 is pressed against the valve seat 36a, whereby the first flow path 31 is closed.

Subsequently, the compressed air is supplied into the pneumatic pressure cylinder 46b to move the piston 47b forward. Then, the driving rod 42b is moved forward, whereby the magnet 44b on the driving side is moved to a position associated with the magnet 41 on the follow up side. With this arrangement, the magnet 41 on the follow up side is attracted by the magnet 44b on the driving side. Accordingly, the second valve body 35 is separated from the valve seat 36b, whereby the second flow path 32 is opened.

In this state, the motor 58 is driven in the direction opposite to that shown in the above-described case. Then, the driving member 52 is moved to the left in FIG. 3, whereby the diaphragm 28 is deformed to contract the pump chamber 27. With this arrangement, the liquid medicine is guided to the nozzle through the flow-out hose 30b, whereby the liquid medicine is discharged from the nozzle. When the motor 58 is stopped in driving, discharge of the liquid medicine is stopped.

Then, in the state where the second valve body 35 opens the second flow path 32, the motor 58 is driven, whereby the diaphragm 28 is slightly retracted to the right in FIG. 3. With this arrangement, the pump chamber 27 is enlarged, the liquid medicine in the forward end portion of the nozzle is sucked and the drooling is prevented.

Subsequently, supply of the compressed air into the pneumatic pressure cylinder 46b is stopped. Then, the driving rod 42b is returned to the original position, whereby the second flow path 32 is closed by the second valve body 35. Thus, a one time of discharge of the liquid medicine is completed.

As described above, according to the present invention, when the on-off operations of the flow paths are carried out by the respective valve bodies 34 and 35, respective valve bodies 34 and 35 are disposed in the valve chambers constituting parts of the flow paths. For this reason, when the on-off operation is carried out, only the valve bodies are moved in the liquid medicine, but, the liquid medicine is not moved by the on-off operation. Accordingly, the discharge quantity of the liquid medicine can be set with high accuracy.

On the other hand, in order to separate the valve housing 11a from the pump housing 11b, it is merely necessary to separate these two members strongly from each other. That is, in the system according to the present invention, the fastening plate 21 of the pump housing 11b and the fastening plate 18 of the valve housing 11a can be separated from each other, and the connecting member 61 and the driving member 52 can be separated from each other. After the separation, such a state is brought about that the two driving rods 42a and 42b are projected from the fastening plate 21. In this state, the whole valve housing 11a or component parts thereof may be exchanged.

As described above, in this liquid medicine supplying system, the driving rods 42a and 42b for driving the valve bodies 34 and 35 are separated from the valve bodies 34 and 35, respectively, and secured to the pump housing 11b. For this reason, even when the whole valve housing 11a is exchanged, the liquid medicine does not leak, so that the exchange works can be easily carried out.

Figure 7:
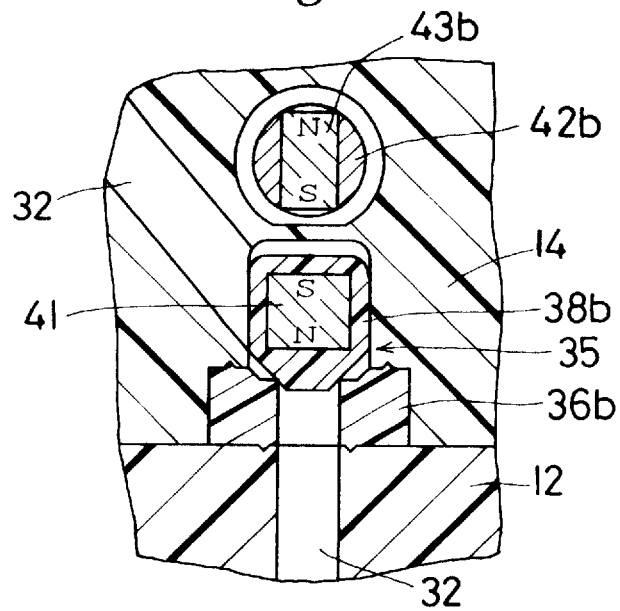
FIG. 7 is a sectional view showing another detailed example of the valve body.

FIG. 7 is the drawing showing the second valve body 35 of another type. In this type, the ball 37 is not present, which is different from the case shown in FIG. 6. In this case, a valve body 38b covering the magnet 41 is brought into contact with a valve seat 36b, whereby the second flow path 32 is on-off operated.

Figure 8A:
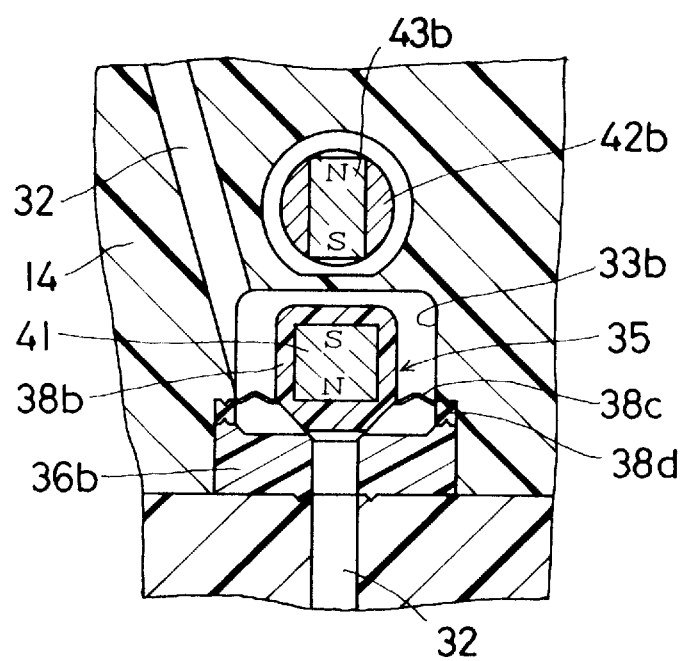
FIG. 8(a) is a sectional view of a further detailed example of the valve body and FIG. 8(b) is an oblique view showing the valve body illustrated in FIG. 8(a)
Figure 8B:
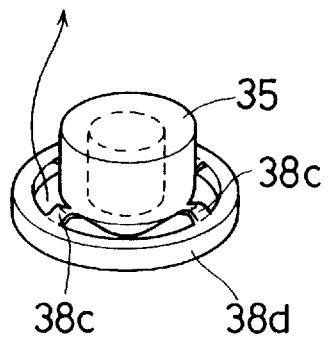

FIG. 8 is the drawing showing the second valve body 35 of a further type. In this case, the shape of the valve body 38b is adapted to come into contact with the valve seat 36b similarly to the case shown in FIG. 7. An annular locking portion 38d is integrally formed on this valve body 38b through a plurality of elastically deformable portions 38c. Then, the locking portion 38d is clamped by the valve housing 11a and fixed thereto. With this arrangement, when the second valve body 35 is on-off operated, the second valve body 35 is not brought into sliding contact with the inner surface of the valve chamber 33b. Accordingly, this portion can be prevented from dusting.

Incidentally, the construction of the second valve body 35 as shown in FIGS. 7 and 8 may be applied to the first valve body 34.

Figure 9:
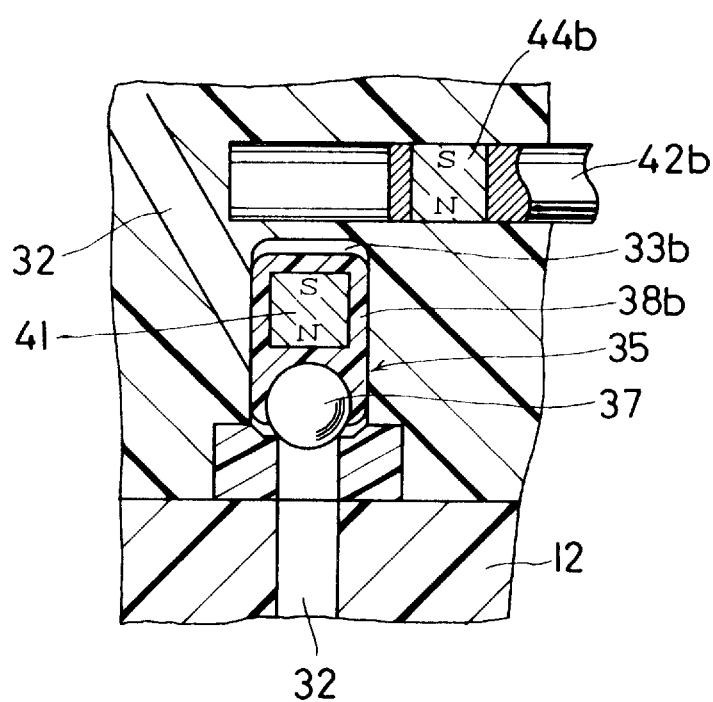
FIG. 9 is a sectional view showing a detailed example of the driving member for driving the valve body.

FIG. 9 is the drawing showing the driving rod 42b of another type for driving the second valve body 35. This second valve body 35 is the check valve for closing the second flow path 32 by the gravity. Then, the driving rod 42b is provided with only one magnet 44b on the driving side. Furthermore, this magnet 44b is set at the polarity for attracting the magnet 41 at a position associated with the magnet 41 on the follow up side.

In this case where the driving rod 42b of this type is used, when suck back operation is carried out, such a state is brought about that the magnet 44b on the driving side is in a state of being associated with the magnet 41 on the follow up side. Then, the diaphragm 28 is deformed in the direction of enlarging the pump chamber 27, the liquid medicine can be caused to flow back into the pump chamber 27.

Incidentally, it is needless to say that the valve of the type as shown in FIG. 9 can be used as a valve to be opened by the liquid pressure and closed by the repulsive force of the magnet, although it is different from the second valve body 35 of the liquid medicine supplying device. In this case, contrary to the aforesaid case, when the magnet 44b comes to the position associated with the magnet 41, the polarity of the magnet 44b is set at a polarity, to which the magnet 41 is repellent.

Figure 10:
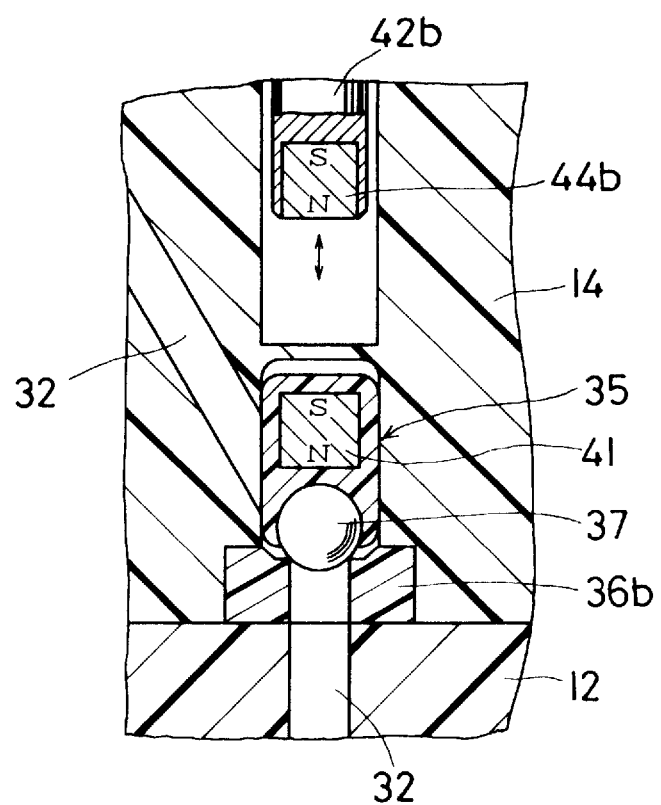
FIG. 10 is a sectional view showing another detailed example of the driving member for driving the valve device.

FIG. 10 is the drawing showing the driving rod 42b of another type for driving the second valve body 35. This second valve body 35 is the check valve for closing the second flow path 32 by the gravity similarly to the case shown in FIG. 9. Furthermore, the driving rod 42b is slidable in the same direction as the on-off operation of the second valve body 35. Then, the magnet 44b having the polarity attracting the magnet 41 when it approaches is provided at the formed end portion of this driving rod 42b. Accordingly, when the magnet 44b is separated, the magnetic force acting on the magnet 41 becomes weak, whereby the second valve body 35 closed the second flow path 32 by its gravity.

Incidentally, it is needless to say that, even with the valve of the type as shown in FIG. 10, the construction thereof can be applied to a valve doing an action differing therefrom. Then, in this case, the polarity of the magnet 44b is set at such a polarity that, when the magnet 44b approaches the magnet 41, the magnet 41 becomes repellent to the magnet 44b.

Figure 11:
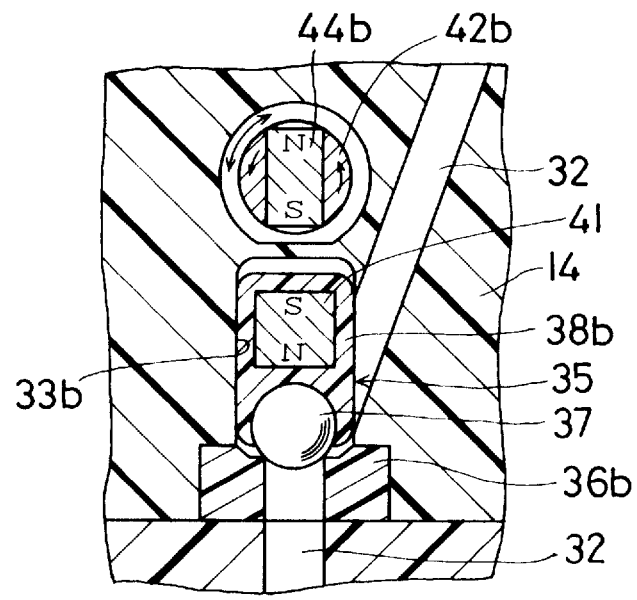
FIG. 11 is a sectional view showing a further detailed example of the driving member for driving the valve body.

FIG. 11 is the drawing showing the driving rod 42b of a further type for driving the second valve body 35. In contrast to that the aforesaid respective driving rods 42b are of the type sliding in the axial direction, in this case, the driving rod 42b is turned through 180°. That is, owing to the turning operation of the driving rod 42b, the magnet 44b is turned together, whereby the polarity of the magnet 33b on the side opposed to the magnet 41 is changed. With this arrangement, the second valve body 35 may be pressed against the valve seat 36b or the second flow path 32 may be opened.

Incidentally, it is needless to say that while FIGS. 9 to 12 show the modified examples of the driving rod 42b, the driving rod 42a may have the same construction as that the driving rod 42b has.

Figure 12:
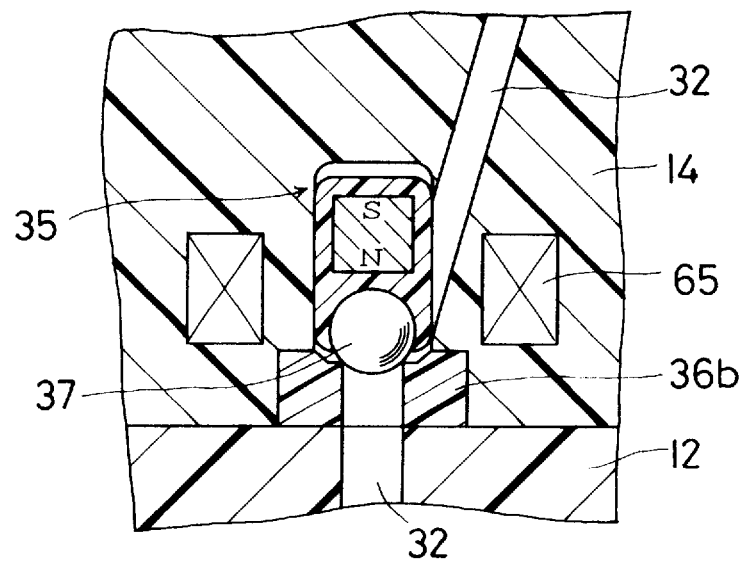
FIG. 12 is sectional view showing a still further detailed example of the driving member for driving the valve body.

FIG. 12 is the drawing showing a still further driving member for driving the second valve body 35. In this case, a solenoid coil 65 is assembled into the valve housing in a manner to surround the second valve body 35. Then, the direction of electric current applied to this coil 65 is changed, whereby the polarity of the magnetic field is changed. With this arrangement, the second valve body 35 may be pressed against the valve seat 36b on the second flow path 32 may be opened.

Figure 13:
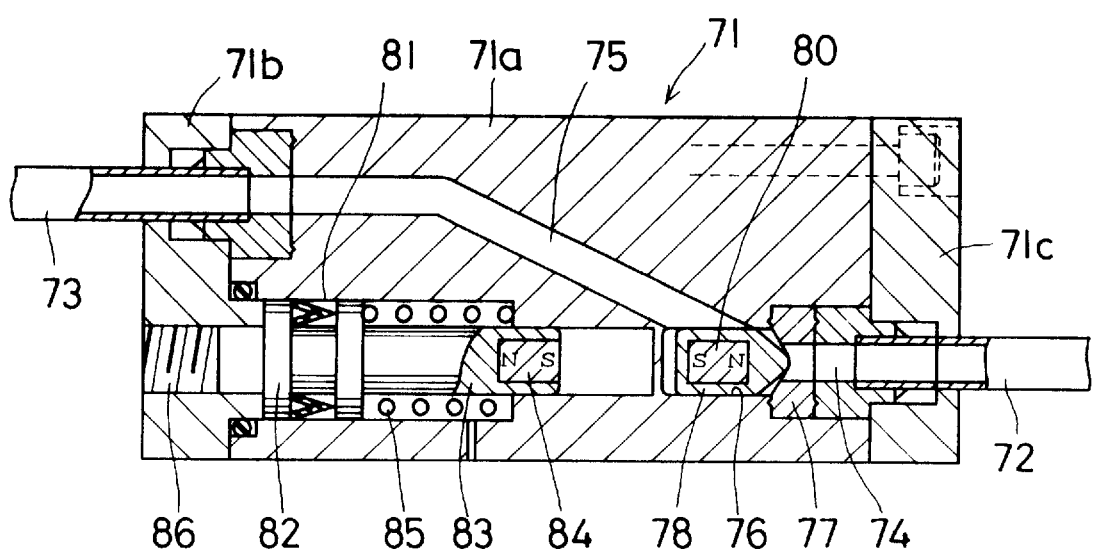
FIG. 13 is a sectional view showing the valve device as being an embodiment according to the present invention.

On the other hand, FIG. 13 is the drawing showing the valve device for on-off operating the flow path. A housing 71 includes a center block 71a and two outer blocks 71b, 71c which are secured to opposite end portions of the center block 71a. A flow-in piping 72 and a flow-out piping 73 are secured to this housing 71. Furthermore, a flow path on the flow-in side 74 communicated with the flow-in piping 72 and a flow path on the flow-out side 75 communicated with the flow-out piping 73 are formed in the housing 71. These flow paths 74 and 75 are connected to each other through a valve chamber 76, and the valve chamber 76 is formed to provide a connecting portion.

A valve body 78 for contacting to a valve seat 77 and on-off operating the flow path is provided in the valve chamber 76. Furthermore, a magnet 80 on the follow up side is provided in this valve body 78. Further, a cylinder chamber 81 is formed in the housing 71. A piston rod 83 being concentric with the center of the valve body 78 is provided on a piston 82 slidably mounted in this cylinder chamber 81 in the axial direction. Then, a magnet 84 on the driving side is secured to the forward end of this piston rod 83.

This magnet 84 has such a polarity that, when it approaches the magnet 80, it causes the magnet 80 to be repellent thereto to press the valve body 78 against the valve seat 77. Accordingly, when the magnet 84 is separated from the magnet 80, the magnetic force of the magnet 84 acting on the magnet 80 is weakened, whereby the force of the magnet 84, which presses the valve body 78 against the valve seat 77, is released.

A compression coil spring 85 for energizing the piston rod 83 in the retracting direction is mounted in the cylinder chamber 81. Then, in order to move the piston rod 83 forward against this resilient force of the spring, there is formed a pneumatic pressure supplying port 86 connected to the pneumatic pressure source in the housing 71.

Accordingly, in order to close the flow paths 74 and 75, the compressed air is supplied from the pneumatic pressure supplying port 86 to drive the piston 82 forward against the resilient force of the spring 85. With this arrangement, the valve body 78 comes into contact with the valve seat 77, whereby the flow paths 74 and 75 are closed. On other hand, when supply of the compressed air is stopped, the valve body 78 opens the flow paths 74 and 75.

Figure 14A:
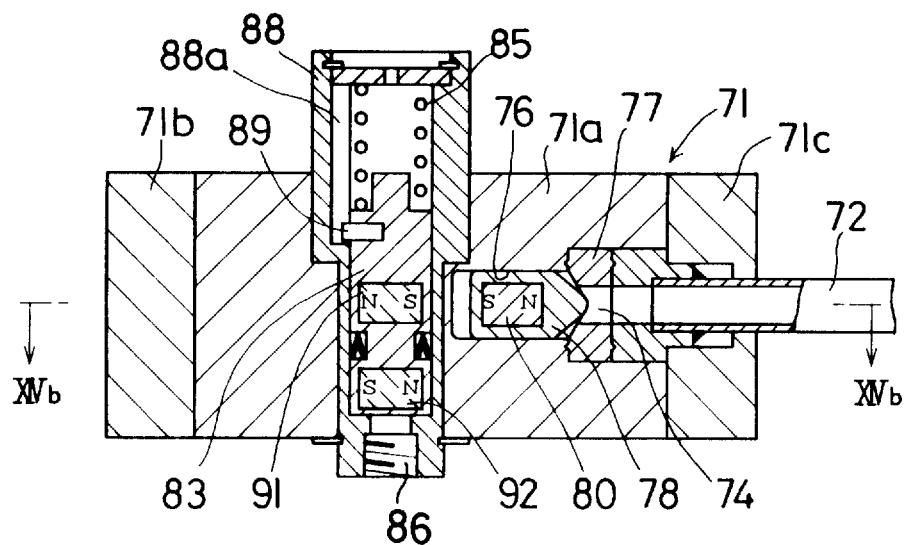
FIG. 14(a) is a sectional view showing the valve device as being another embodiment according to the present invention and FIG. 14(b) is a sectional view taken along the line XIVb—XIVb in FIG. 14(a).
Figure 14B:
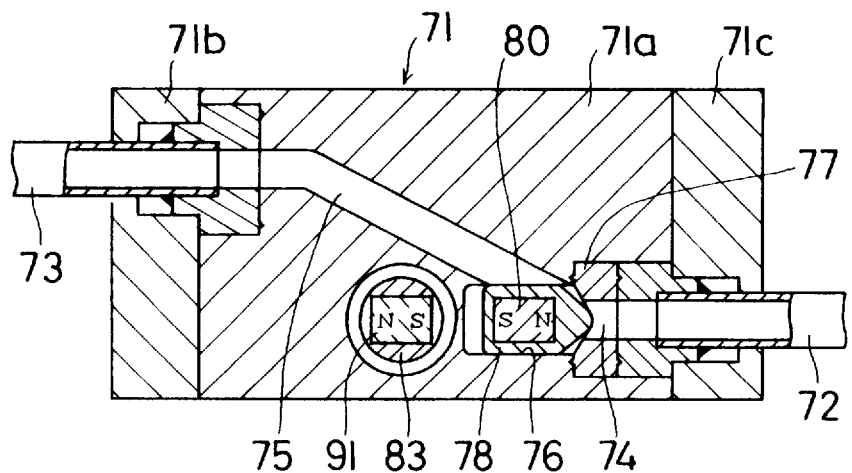

FIG. 14(a) is the sectional view showing the valve device as being another embodiment according to the present invention and FIG. 14(b) is the sectional view taken along the line XIVb—XIVb in FIG. 14(a). In these drawings, the members common to those shown in FIG. 13 are designated by the same reference numerals.

In this valve device, a pneumatic pressure cylinder 88 is assembled into the housing 71 in a direction substantially perpendicular to the on-off operating direction of the valve body 78. Furthermore, the piston rod 83 is slidably mounted in the axial direction in the pneumatic pressure cylinder 88. This piston rod 83 is located at the original position by the resilient force of the compression coil spring 85. This original position is set in such a manner that a rotation-locking pin 89 secured to the piston rod 83 is abutted against a stepped portion of the pneumatic pressure cylinder 88. This rotation-locking pin 89 slidably moves along a groove 88a formed in the pneumatic pressure cylinder 88 in the longitudinal direction.

Magnets 91 and 92 on the driving side are provided in the piston rod 83. The magnet 91 is opposed to the magnet 80 in the valve body 78 at the original position and has the polarity for making the magnet 80 on the follow up side be repellent. Furthermore, when the piston rod 83 is retracted by the compressed air from the pneumatic pressure supplying port 86, the magnet 92 is moved to a position associated with the magnet 80. This magnet 92 has the polarity of attracting the magnet 80. Accordingly, in this case also, the valve body 78 can be forcibly on-off operated by the magnetic force of the magnets 91 and 92 on the driving side.

In this case, the construction shown in FIG. 8 may be adopted as the construction of the valve body 78. Furthermore, as shown in FIG. 11, the driving rod is rotated, so that the polarity of the magnet on the driving side to the magnet 80 on the follow up side, which is provided on the valve body 78 may be changed. Further, as shown in FIG. 12, by use of a solenoid coil, the magnetic force may be acted on the magnet 80 on the follow up side. Incidentally, in the valve devices shown in FIGS. 13 and 14 also, the housing 71 and the valve body 78 may be made of resin such as PTFE.

As described above, according to the present invention, the flow paths on-off operated by the valve bodies are simplified, so that occurrence of stagnation of the liquid in the flow paths can be avoided. Then, with this arrangement, even in the liquid medicine supplying system, the liquid medicine does not stagnate in the flow paths, and dusting caused by the stagnation can be avoided.

Furthermore, the valve bodies are located in the flow paths, through which the liquid medicine flows, so that when the valve bodies are on-off operated, the liquid medicine in the flow paths are not moved. Accordingly, the fluctuations of the liquid medicine at the time of on-off operation of the flow paths can be avoided.

Further, even when the suck back operation is carried out by use of the pump, the magnetic force is caused to act from outside, so that the valve bodies can be operated. For this reason, even when the valve bodies are closed after the suck back operation, the liquid medicine in the flow paths is not moved or fluctuated. Accordingly, occurrence of the fluctuations on the liquid surface of the liquid medicine discharge portion can be avoided. Furthermore, occurrence of the fluctuations on the liquid surface are avoided, so that production of bubbles in the liquid medicine can be avoided.

Further, since the on-off operation of the valve bodies give no adverse influence to the discharge quantity of the pump, the liquid medicine supplying system having the high discharge accuracy can be provided.

Detailed description has hereinabove been given of the invention achieved by the present invention with reference to the embodiment. However, the present invention should not be limited to the embodiment described above, and may be variously modified within the scope not departing from the gist.

For example, in the system shown in FIGS. 3 and 4, the first and second valve bodies are on-off operated by the magnets. However, only one of the valve bodies may be operated by the magnet. Furthermore, as the reciprocating member, the bellows 3 shown in FIG. 1 may be used without using the diaphragm 28. Further, the piston and the like may be used instead of the diaphragm 28.

Furthermore, in the liquid medicine supplying system shown in FIG. 3, the diaphragm 28 is reciprocated by the motor 58. However, the diaphragm 28 may be driven by the pneumatic pressure cylinder.

Further, in the above embodiment, the magnet on the driving side is driven by the pneumatic pressure cylinder. However, this may be moved or rotated by a motor, a solenoid or the like.

I claim:

1. A liquid medicine supplying system comprising:

a valve housing including a pump chamber provided with an elastically deformable portion and covered with walls made of fluorine resin, and a block made of fluorine resin formed with a first flow path for guiding liquid stored in a liquid storage tank to said pump chamber and with a second flow path for guiding the liquid stored in said pump chamber to a liquid discharge portion;

a pump housing provided with a pump driving means which reciprocates in said elastically deformable portion, said valve housing being detachably fitted to said pump housing;

a first valve body made of fluorine resin disposed in said first flow path for on-off operating said first flow path, with a magnet on the follow up side being embedded inside said first valve body;

a second valve body made of fluorine resin disposed in said second flow path for on-off operating said second flow path, with a magnet on the follow up side being embedded inside said second valve body;

a first magnet on the driving side provided in said valve housing, for changing polarity of the magnetic field acting on said magnet on the follow up side inside the first valve body, whereby said first valve body is set at an opening position or a closing position;

a second magnet on the driving side provided in said valve housing, for changing polarity of the magnetic field acting on said magnet on the follow up side inside the second valve body, whereby said second valve body is set at an opening position or a closing position;

a first valve driving means provided in said pump housing, for driving said first magnet on the driving side; and a second valve driving means provided in said pump housing, for driving said second magnet on the driving side.

2. A liquid medicine supplying system as set forth in claim 1, wherein:

said pump chamber is expanded at the time of suck back under the condition that the first magnet on the driving side applies a force on the first valve body in a direction of closing said first flow path and the second magnet on the driving side applies force on the second valve body in a direction of opening said second flow path.

3. A liquid medicine supplying system as set forth in claim 1, wherein:

said pump housing includes a fastening plate formed with recesses receiving magnets; and said valve housing includes a fastening plate to be attached by said magnets;

so that said pump housing and said valve housing are detachably connected to each other by said magnets.

4. A liquid medicine supplying system as set forth in claim 1, wherein:

said pump driving means includes a magnet to be attracted by a connecting member of magnetic material attached to said elastic deforming portion, so that, when said valve housing is separated from said pump housing, the liquid medicine in the valve housing does not flow out.

5. A liquid medicine supplying system comprising:

a valve housing including a pump chamber provided with an elastically deformable portion and covered with a wall made of fluorine resin, and a block made of fluorine resin formed with a first flow path for guiding liquid stored in a liquid storage tank to said pump chamber and with a second flow path for guiding the liquid stored in said pump chamber to a liquid discharge portion;

pump housing provided with a pump driving means which reciprocates in said elastically deformable portion, said valve housing being detachably fitted to said pump housing;

a first valve body made of fluorine resin disposed in said first flow path, with a magnet on the follow up side being embedded inside said first valve body, and said first valve body being under an opening action by flow in said first flow path going toward said pump chamber at the time of expansion of the pump chamber, and under a closing action by flow in reverse direction;

a second valve body made of fluorine resin disposed in said second flow path, with a magnet on the follow up side being embedded inside said second valve body, and said second valve body being under an opening action by flow in said second flow path going toward said liquid discharge portion at the time of contraction of the pump chamber, and under closing action by flow in reverse direction;

a first magnet on the driving side provided in said valve housing, for changing polarity of the magnetic field acting on said magnet on the follow up side inside the first valve body, so as to apply a magnetic force to move said first valve body toward an opening position or a closing position;

a second magnet on the driving side provided in said valve housing, for changing polarity of the magnetic field acting on said magnet on the follow up side inside the second valve body, so as to apply a magnetic force to move said second valve body toward an opening position or closing position;

a first valve driving means provided in said pump housing, for driving said first magnet on the driving side; and a second valve driving means provided in said pump housing, for driving said second magnet on the driving side.

6. A liquid medicine supplying system as set forth in claim 1, wherein:

said pump chamber is expanded at the time of such back under he condition that the first magnet on the driving side applies force on the first valve body in a direction of closing said first flow path and the second magnet on the driving side applies force on the second valve body in a direction of opening said second flow path.

* * * * *